United States Patent Office 3,544,507
Patented Dec. 1, 1970

3,544,507
DEDUSTING AND AGGLOMERATING
ACTIVATED CARBON
Roger V. Lloyd, Pittsburgh, Pa., assignor, by mesne assignments, to Calgon Corporation, a corporation of Delaware
No Drawing. Filed Aug. 23, 1967, Ser. No. 662,589
Int. Cl. B01d 29/08; C08g 51/08
U.S. Cl. 260—39
15 Claims

ABSTRACT OF THE DISCLOSURE

Agglomerated activated carbon is prepared by treating the carbon with a mixture of (1) a copolymer of acrylamide or derivative thereof and at least one comonomer such as ethyl acrylate and (2) an aminoplast thermosetting resin. In order to decrease dusting of the carbon particles they are coated with the resin mixture.

---

The present invention relates to dedusting and agglomerating activated carbon.

Activated carbon presents a dust problem. Thus, in mixing activated carbon with reclaimed rubber a large amount of dust is created. Ideally, the activated carbon should be in the form of balls or pellets rather than with significant amounts of dust being present for use with natural or synthetic rubber, e.g., butadiene-styrene copolymer, butyl rubber, ethylene-propylene polyene terpolymer rubber, et cetera.

It is also frequently desirable to agglomerate carbon particles for other uses, e.g., for filters, such as cigarette filters, air conditioning filters, heating plant filters, gas mask filters, removal of hydrocarbons from gas streams, e.g., in automobiles, etc.

Unfortunately, however, most adhesives do not satisfactorily bond activated carbon particles together and those adhesives which do have some bonding properties seriously deteriorate the adsorptive capacity of the activated carbon.

It is an object of the present invention to reduce the dusting of activated carbon particles.

Another object is to bond activated carbon particles without unduly impairing their adsorptive capacity.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be attained by coating activated carbon particles or bonding the activated carbon particles with a mixture of a particular type of a polymer of a plurality of compounds containing a vinylidene group and a water soluble thermosetting aminoplast. The coated or bonded products greatly reduce the dusting problem with activated carbon. The bonded carbon can be made into sheets, cubes, cylindrical rods and other forms and can be employed for filters such as those of the types previously set forth and in all other areas where activated carbon is conventionally employed.

As the activated carbon there can be employed granular activated carbon such as Pittsburgh types BPL, CAL, BPX, SGL (made as described in Zabor Pat. 2,763,580), as well as other commercial activated carbons. Impregnated activated carbons can also be used.

The granular activated carbon usually has a mesh size of about 4 to 60 mesh, e.g., 4 x 10 mesh, 12 x 30 mesh and 14 x 40 mesh although this can be varied. The pulverized activated carbon of course is of smaller particle size, e.g., minus 100 mesh. Unless otherwise indicated all mesh sizes are U.S. Sieve Series.

The water insoluble vinylidene polymer employed is a copolymer of 2 to 20 (preferably 2 to 10) parts of acrylamide or methacrylamide or methylol or methoxymethyl acrylamide or methacrylamide with 80 to 98 parts of at least one monomer of the group of lower alkyl esters of acrylic acid and methacrylic acid, styrene, p-methyl styrene, o-methyl styrene, m-methyl styrene and acrylonitrile. Examples of alkyl acrylates and methacrylates are methyl acrylate, ethyl acrylate, propyl acrylate, isopropyl acrylate, butyl acrylate, hexyl acrylate, heptyl acrylate, n-octyl acrylate, 2-ethylhexyl acrylate, isooctyl acrylate and the corresponding esters of methacrylic acid, e.g., methyl methacrylate, ethyl methacrylate, butyl methacrylate and n-octyl methacrylate.

The preferred vinylidene compound polymer is a copolymer of acrylamide (or methacrylamide), an acrylate ester and a methacrylate ester, most preferably a copolymer of 2 to 10% acrylamide and 98 to 90% of a mixture of 1 to 3 parts of ethyl acrylate with 1 part of methyl methacrylate, e.g., a copolymer of ethyl acrylate and methyl methacrylate in a ratio of 1:1 or 2:1.

As the water soluble thermosetting aminoplast there can be used the methylol derivatives of urea, thiourea, guanidine, cyclic ethylene urea, cyclic propylene urea, cyclic ethylene thiourea, melamine, trimethyl melamine and other alkyl melamines, triphenyl melamine and other aryl melamines, formoguanamine, acetoguanamine, benzoguanamine and other alkyl and aryl guanamines as well as other aminotriazines as set forth in Widmer Pat. 2,197,-357. The preferred aminoplasts are urea and melamine-formaldehyde reaction products including dimethylol urea, sesquimethylol urea, di, tri, tetra, penta or hexamthylol melamine. Most preferably the urea or melamine-formaldehyde condensation product is modified with a lower alkonal such as methyl alcohol or ethyl alcohol. Examples of such products are dimethoxymethyl urea, trimethylol melamine trimethyl ether, pentamethylol melamine tetramethyl ether, pentamethylol-melamine pentamethyl ether, N.N' bis(methoxymethyl) uron, pentamethylol melamine trimethyl ether.

Specific examples of vinylidene copolymers which are suitable are:

(1) A terpolymer made from 180 parts of ethyl acrylate, 222 parts of methyl methacrylate and 21.2 parts of methacrylamide;

(2) A terpolymer of 210 parts 2-ethylhexyl acrylate, 573 parts methyl methacrylate and 40 parts methacrylamide;

(3) A polymer of 330 parts of ethyl acrylate, 330 parts of vinyl toluene, 15 parts of methoxymethyl methacrylamide and 15 parts of acrylamide;

(4) A terpolymer of 440 parts of ethyl acrylate, 340 parts methyl methacrylate, and 37 parts of acrylamide;

(5) A polymer made of 440 parts ethyl acrylate, 340 parts methyl acrylate and 37 parts acrylamide further reacted with 100 parts of styrene;

(6) A polymer of 89 parts of ethyl acrylate, 110 parts methyl methacrylate, 5.25 parts methacrylamide and 5.75 parts of methylol methacrylamide;

(7) A terpolymer of 52.5 parts methyl methacrylate, 42.5 parts ethyl acrylate and 5 parts methacrylamide;

(8) A terpolymer of 66 parts ethyl acrylate, 26 parts methyl methacrylate and 8 parts methacrylamide;

(9) A terpolymer of 42.5 parts ethyl acrylate, 52.5 parts of styrene and 5 parts methacrylamide;

(10) A terpolymer of 42.5 parts of ethyl acrylate, 26.5 parts styrene, 26.5 parts methyl methacrylate and 4.5 parts methacrylamide;

(11) A terpolymer of 67 parts ethyl acrylate, 33 parts methyl methacrylate and 5 parts acrylamide.

The melamine-formaldehyde or other aminoplast can be 10 to 50% of the total of the vinylidene polymer and the aminoplast.

The thermosetting resin mixture is normally employed as an aqueous mixture, conveniently of 40–70% solids content, although this can be varied.

To accomplish the coating the activated carbon granules are dispersed in the aqueous resin mixture removed and dried. The coated granules can be passed through an oven, e.g., at 110° C., on a belt or the bonded particles can be placed in a mold where the bonded particles are dried and the resin allowed to cure. Curing of the resin can be accomplished at room temperature, but is accelerated at elevated temperatures, e.g., 95–200° C.

The preferred resin is a mixture of 30% pentahydroxymethyl melamine and 70% of a terpolymer of 67 parts ethyl acrylate, 33 parts methyl methacrylate and 5 parts acrylamide. This mixture is hereinafter called Resin Mixture 1.

Unless otherwise indicated all parts and percentages are by weight.

Sheets up to 24 inches by 16 inches by ¾ inch have been successfully prepared by bonding activated carbon of 12 x 30 mesh.

While not essential it has been found desirable to add a small amount, e.g., 0.1–5% based on the carbon, of chopped glass fibers as a stiffener in preparing the sheets. Thus, in some examples sheets were prepared from BPL activated carbon of 14 x 40 mesh activated carbon containing 1% of ½ inch long chopped glass fibers (Owens Corning Fiberglass Type 851) and bonded with 5% of Resin Mixture 1. In place of glass fibers there can be used other stiffening fibers or meshes such as polyethylene, polypropylene, nylon, copper or other metal wire, etc.

The thermosetting binder in the present invention is preferably employed in an amount of 2.5–10% by weight of the carbon although it can be used in an amount of 2 to 25% of the carbon. As the amount of binder goes up the adsorption efficiency goes down. If too little binder is employed there is a problem in holding the activated carbon particles together and in eliminating dusting.

As previously indicated it is critical to use the thermosetting resin composition of the present invention as the binder in order to obtain satisfactory bonding without too great a loss in adsorption capacity of the carbon.

Thus, when a 2:1 ethyl acrylate-methyl methacrylate copolymer without melamine-formaldehyde was employed there was substantial reduction in adsorption capacity. Elvacet 1454 (vinyl acetate-butyl maleate polymer emulsion) will bind the activated carbon particles together, but impairs the adsorption capacity of the carbon. Goodrite 2570 X5 (carboxylate butadiene-styrene polymer emulsion) also was unsatisfactory as a binder for the activated carbon.

EXAMPLE 1

In a specific example to 12 x 30 mesh Pittsburgh Type BPL carbon having a $CCl_4$ number of 63 and containing 1% of ½ inch long chopped glass fibers there was added equal parts of a 2:1 ethyl acrylate methyl methacrylate copolymer and Resin Mixture 1 emulsions (each of about 50% solids) to provide 7.5 parts of ethyl acrylate-methyl methacrylate copolymer and 7.5 parts of Resin Mixture 1 based on the carbon. (This 2:1 ethyl acrylate-methyl methacrylate copolymer is called Resin 2 and the mixture of equal parts of Resin 2 and Resin Mixture 1 is hereinafter called Resin Mixture 3.) The resulting slurry was poured into a foil-lined tray, dried for 2 hours at 150° C. to give an excellent firm but flexible sheet having a $CCl_4$ number of 60.3 (average of 6 sheets). The sheets were 24″ x 16″ x ¾″.

EXAMPLE 2

Using the same Resin Mixture 3 as in Example 1 to bond BPL activated carbon without any glass fibers the mixture was placed into a glass tube to provide a cylindrical shape and then was dried at 110° C. for 1 hour. The chloropicrin (PS) lifetimes were measured for different percentages of binder. Pressure drop measurements were made on the same tubes with nitrogen gas at a flow rate of 1 liter per minute per cm.$^2$ cross-sectional area.

With the exception of the 4 x 10 mesh carbon the inclusion of the binder improved the pressure drop characteristics of the carbon. For the small mesh sizes, e.g., 14 x 40 mesh the PS lifetime loss is offset by the improved pressure drop. The bonded carbon furthermore has the advantage in use that the bonding can prevent settling and channeling.

TABLE 1

| Experiment: | Carbon mesh size | Percent binder | PS lifetime, minutes | Pressure drop, mm. $H_2O$ |
|---|---|---|---|---|
| 1 | 4 x 10 | 0 | 28 | 7 |
| 2 | 4 x 10 | 5 | 7 | 6 |
| 3 | 4 x 10 | 5 | 3 | 5 |
| 4 | 4 x 10 | 10 | 0.5 | 7 |
| 5 | 4 x 10 | 10 | 0.5 | 6 |
| 6 | 6 x 16 | 0 | 41 | 19 |
| 7 | 6 x 16 | 5 | 25 | 11 |
| 8 | 6 x 16 | 5 | 14.5 | 10 |
| 9 | 6 x 16 | 10 | 4 | 11 |
| 10 | 6 x 16 | 10 | 1 | 10 |
| 11 | 12 x 30 | 0 | 51 | 73 |
| 12 | 12 x 30 | 5 | 25 | 30 |
| 13 | 12 x 30 | 5 | 28 | 34 |
| 14 | 12 x 30 | 10 | 14 | 37 |
| 15 | 12 x 30 | 10 | 5 | 28 |
| 16 | 14 x 40 | 0 | 52 | 130 |
| 17 | 14 x 40 | 5 | 34 | 47 |
| 18 | 14 x 40 | 5 | 35 | 43 |
| 19 | 14 x 40 | 10 | 29 | 59 |
| 20 | 14 x 40 | 10 | 24 | 50 |

In the following examples unless otherwise indicated the bed depths were 5 cm. and the bonded carbons were dried at 150° C. overnight.

For the PS (chloropicrin) test a dry air stream was saturated with PS at 0° C. and passed through the cans containing the bonded carbon and the effluent air stream passed through a tube furnace to burn any residual chloropicrin to free chlorine which was detected by a color change in a starch-iodide indicator.

Air flow was carried out at 100 ml./sq. cm./min., the air containing approximately 47 mg. of chloropicrin/liter. Since the top surface area of the cans containing the bonded activated carbon was 82 sq. cm. the total air flow rate was 8200 ml./min.

The chloropicrin breakthrough was considered to be the time of the first color change in the indicator solution that was repeated within two minutes with a fresh portion of the indicator solution.

In the tests the PS lifetime indicate the rate of adsorption while the $CCl_4$ number indicates the equilibrium capacity.

EXAMPLE 3

In this example the effect of coating activated carbon particles to reduce dusting but without significant bonding was determined. Loose particles of copper-chrome-silver compound activated carbon 12 x 30 mesh were mixed with the indicated polymer emulsions and dried to provide coated products having the stated amount of polymer. To prevent bonding the wet coated carbon particles were dried at 150° C. in shallow trays with frequent stirring. After drying the coated carbon particles were placed in cans.

TABLE 2

| Coating polymer | Percent wt. polymer | PS lifetime, minutes | CCl₄ No. |
|---|---|---|---|
| Goodrite 2570 X5 | 5.0 | 6 | 32.1 |
| Elvacet 1454 | 5.0 | 0 | 49.0 |
| Do | 2.5 | 8 | 50.5 |
| Resin Mixture 1 | 5.0 | 26 | 42.9 |
| Do | 2.5 | 46 | 49.7 |
| Resin 2 | 5.0 | 5 | 33.3 |
| Do | 2.5 | 28 | 50.3 |
| Virgin carbon (no polymer) | | 43 | 46.8 |

Copper-chrome-silver compound activated carbon (12 x 30 mesh) was prepared by impregnating granular Pittsburgh Type BPL carbon (12 x 30 mesh) with a mixture of 114 grams of $CuCO_3Cu(OH)_2$; 34 grams of $CrO_3$ and 3 grams of $AgNO_3$ in 284 cc. of aqueous ammonia (25 volume percent) and 390 cc. of water. The impregnated carbon was dried to give the copper-chrome-silver compound carbon containing 0.24 gram of impregnant per each gram of activated carbon. This impregnated activated carbon was used to prepare bonded samples in the manner set forth in Example 2 and the PS lifetime and Equilibrium Adsorption were determined as set forth in Table 3. The binders as indicated were Resin Mixture 1 and/or Resin Mixture 2.

TABLE 3

| Sample | Resin mixture 1 | Resin 2 | PS lifetime, (minutes) | PS pickup, percent of carbon weight |
|---|---|---|---|---|
| 1 | 0 | 10 | 0.5 | |
| 2 | 0 | 5 | 0.3 | |
| 3 | 7.5 | 7.5 | 2.75 | |
| 4 | 5 | 5 | 2 | |
| 5 | 7.5 | 2.5 | 63 | 14.2 |
| 6 | 10 | 0 | 112 | 23 |
| 7 | 5 | 0 | 150.2 | 32.7 |
| 8 | 2.5 | 0 | 135 | 25.4 |
| 9 | 15 | 0 | 0.4 | |
| 10 | 0 | 0 | 191 | |

EXAMPLE 4

The effect of bed depth was determined for various beds of the bonded copper-chrome-silver compound impregnated activated carbon (12 x 30 mesh) with the results set forth in Table 4 using 5% Resin Mixture 1 as the binder.

TABLE 4

| Sample | Bed depth, cm. | PS lifetime, minutes | PS pickup, percent of carbon weight |
|---|---|---|---|
| 1 | 5 | 150.2 | 32.7 |
| 2 | 4 | 103 | 24.0 |
| 3 | 3 | 62 | 19.8 |
| 4 | 2 | 11.8 | 6.1 |
| 5 | 1 | 3.1 | 5.2 |

For best results Resin Mixture 1 is used in an amount of at least 5% and not over 10% resin binder based on the carbon. When only 2.5% of Resin Mixture 1 is employed the mechanical properties of the bonded activated carbon were considerably inferior to those of the activated carbon bonded with at least 5% of Resin Mixture 1. Thus, when only 2.5% of Resin Mixture 1 was employed the bonded activated carbon particles broke up very easily.

What is claimed is:

1. Activated carbon particles coated or bonded with a thermosetting resin composition employed in amounts of 2 to 25 percent by weight based on the carbon, said resin composition comprising (1) a water insoluble copolymer of 2 to 20 parts of an amide member of the group consisting of acrylamide, methacrylamide, methylol acrylamide, methylol methacrylamide, methoxymethyl acrylamide, and methoxymethyl methacrylamide with 98 to 80 parts of at least one monomer of the group consisting of lower alkyl resins of acrylic acid, lower alkyl esters of methacrylic acid, styrene, methyl styrene and acrylonitrile, and (2) a water soluble thermosetting aminoplast employed in amounts of 10 to 50 percent by weight of the total copolymer and aminoplast, said aminoplast consisting of methylol derivatives of urea, thiourea, guanidine, cyclic urea, cyclic thioureas, melamine, alkyl melamines, guanamine, alkyl guanamines, aryl guanamines, lower alkoxy methyl ureas, lower alkoxy methyl melamines.

2. Activated carbon particles according to claim 1 wherein component (2) is a urea formaldehyde or melamine formaldehyde product.

3. Activated carbon particles according to claim 2 wherein said amide member is acrylamide or methacrylamide.

4. Activated carbon particles according to claim 1 coated or bonded with a thermosetting resin composition comprising (1) ethyl acrylate-methyl methacrylate-acrylamide terpolymer wherein the acrylamide is 2 to 10% of the terpolymer and (2) a member of the group consisting of water soluble urea and melamine formaldehyde resins.

5. The composition according to claim 4 wherein member (2) is melamine formaldehyde.

6. Particles according to claim 5 wherein there is employed 2.5 to 15% of the resin composition based on the carbon.

7. Particles according to claim 5 wherein there is employed 5 to 10% of the resin composition based on the particles.

8. Particles according to claim 7 which are bonded with 5 to 10% of the resin composition, said resin composition comprising 70% of the copolymer and 30% of the melamine-formaldehyde, said terpolymer containing 2 parts of ethyl acrylate per part of methyl methacrylate.

9. Particles according to claim 5 wherein their is employed 2.5 to 15% of the resin composition based on the carbon and the resin composition contains 90–50% of ethyl acrylate-methyl methacrylate-acrylamide terpolymer and 10–50% melamine-formaldehyde resin.

10. Particles according to claim 9 which are bonded with 5 to 10% of the resin composition.

11. Particles according to claim 10 wherein the resin composition comprises 70% of the copolymer and 30% of pentamethylolmelamine resin, said terpolymer containing 2 parts of ethyl acrylate per part of methyl methacrylate.

12. Activated carbon particles according to claim 4 in bonded form and containing a small amount of glass fibers based on the carbon.

13. Bonded activated carbon particles according to claim 12 in sheet form.

14. Bonded particles according to claim 13 wherein the glass fibers are present in an amount of 1% of the carbon.

15. Activated carbon particles according to claim 4 in bonded form and containing a small amount of reinforcing fibers or meshes based on the carbon.

References Cited

UNITED STATES PATENTS

| 3,015,367 | 1/1962 | Smith | 131—269 X |
| 3,033,811 | 5/1962 | Brown et al. | 260—856 X |
| 3,091,550 | 5/1963 | Doying | 117—76 |
| 3,217,715 | 11/1965 | Berger et al. | 55—387 X |

ALLAN LIEBERMAN, Primary Examiner

J. H. DERRINGTON, Assistant Examiner

U.S. Cl. X.R.

55—387; 117—100, 228; 131—267, 269; 260—41, 851, 856